United States Patent [19]
Grittner et al.

[11] 4,122,583
[45] Oct. 31, 1978

[54] FASTENING CLIPS FOR TRIM PANELS PARTICULARLY FOR MOTOR VEHICLES

[75] Inventors: Heinz Grittner, Kürten-Dürscheid; Ralph Giese, Frechen-Buschbell; Paul Korner, Cologne, all of Fed. Rep. of Germany

[73] Assignee: Ford Motor Company, Dearborn, Mich.

[21] Appl. No.: 895,196

[22] Filed: Apr. 10, 1978

[30] Foreign Application Priority Data

Apr. 23, 1977 [DE] Fed. Rep. of Germany ....... 2718170

[51] Int. Cl.² .................... A44B 17/00; F16B 13/04
[52] U.S. Cl. ..................... 24/208 A; 24/213 R; 24/73 P; 24/211 R; 85/81; 85/72; 52/511
[58] Field of Search ............... 24/208 A, 73 P, 73 PF; 85/DIG. 2, 5 E, 72, 81

[56] References Cited
U.S. PATENT DOCUMENTS 3,074,134  1/1963  Buechler ........................ 85/72
3,162,086  12/1964  Wells .............................. 85/82

Primary Examiner—Bernard A. Gelak
Attorney, Agent, or Firm—John J. Roethel; Keith L. Zerschling

[57] ABSTRACT

A fastening clip comprising a rectangular shaft portion connected to a support disk by a preset frangible point and pivotally connected to a pair of spread arms which are pivotally connected to a pair of jamming arms formed on the support disk. The clip shaft portion is provided with recesses cooperating with the broken edges of the preset frangible point to keep the clip in its fastened condition.

7 Claims, 8 Drawing Figures

FASTENING CLIPS FOR TRIM PANELS PARTICULARLY FOR MOTOR VEHICLES

BACKGROUND OF THE INVENTION

The present invention relates to a fastening clip for upholstered cover elements, in particular motor vehicle trim elements. The fastening clip has a flat, disc-shaped retainer head extending perpendicularly to the clip axis, a central circular neck having a length corresponding to the thickness of the trim element, a thin, disc-shaped sealing collar disposed parallel to the retainer head and retention elements adjoining the latter and formed by at least two mutually opposite spring tongues or resilient arms which cooperate through detent shoulders with a locating hole in the body panel.

A fastening clip substantially of the kind introductorily described is already known from German patent DT-AS No. 1,243,536. In the case of this fastening clip, the retention elements consist of two mutually opposite spring tongues or resilient arms which are formed by slotting a taper pin, adjoining a cylindrical reduced diameter used as a detent, which pin is of larger diameter than the diameter of the locating hole in the body panel.

It has been discovered, where these fastening clips are concerned, that the clip, which is made of injection-moulded low-elasticity synthetic material, can be manufactured with adequate accuracy but that the tolerances on the locating holes in the body panel, as well as the quality of the edge finish in the holes, fluctuates widely so that the clip is alternately either too tight or too loose in the hole when assembled. If the clip fits too tightly in the hole, then it is virtually impossible to remove the trim element or the like for repair purposes, for example, while if the clip fits too loosely, because of the various vibrations which develop in a motor vehicle, the trim element may start to rattle.

Another fastening clip of the kind introductorily described is already known from German petty patent DT-Gbm No. 1,930,693. In the case of this clip, the detent elements are formed by two mutually opposite spring arms which cooperate through elbow-shaped shoulders with a locating hole in the body panel. Again, with this clip, the same difficulties are encountered, namely, that the quality of the fit of the clip depends very largely upon the tolerance of the locating holes in the body panel, as well as upon the quality of the finish of the hole edges.

SUMMARY OF THE INVENTION

In the case of the fastening clip in accordance with this invention, the conventional retainer head with neck and sealing collar is followed by a central rectangular shank connected through a deliberate frangible point to a supporting disc of part circular shape on whose underside two clip arms extend parallel to the clip axis and away from the supporting disc. These arms have substantially rectangular cross sections and are formed in such a manner that they can be inclined, the other ends of said arms being articulated through an integral hinge to respective spreader arms of rectangular cross section extending back substantially parallel to the clip axis and the supporting disc. The spreader arms have their other ends articulated to the end of the shank through integral hinges. The shank is provided at the top of its transverse sides with detent grooves cooperating with the break edges of the deliberate frangible point, which edges are designed as detent edges. The retaining of the fastening clip is effected not in the locating hole in the body panel as in the conventional methods but instead at the detent edges on the supporting disc 8 which is fixed in the locating hole in the body panel by virtue of the deployment of the clip and spreader arms by the shank. The dimensions of the clip and spreader arms are here so contrived that they can be freely inserted even when the locating hole is at its minimum size. After the supporting disc has moved into contact with the body panel, the continued application of pressure on the shank causes the deliberate frangible point to rupture and the clipping and spreading motion on the part of the clip and spreader arms to be initiated. The spread position of the clip and spreader arms is so contrived in this context that even when the locating hole has its maximum dimension, the supporting disc is securely fixed in position. At the end of the inward motion of the shank, the break edges of the deliberate frangible point, these being designed as detent edges, engage in the detent grooves formed at the top transverse side of the shank and thus secure the fixing clip in its inserted position.

It will readily be appreciated that the force now required to insert and withdraw the fastening clip depends no longer upon the widely fluctuating tolerances on the locating hole in the body panel, but simply upon the dimensioning of the detent edges at the deliberate frangible point in the supporting disc and of the detent grooves in the shank, which dimensions can be maintained with relatively greater accuracy.

DESCRIPTION OF THE DRAWINGS

The invention will be explained in more detail making reference to two examples illustrated in the attached drawings.

DETAILED DESCRIPTION OF THE INVENTION

Figure 1:
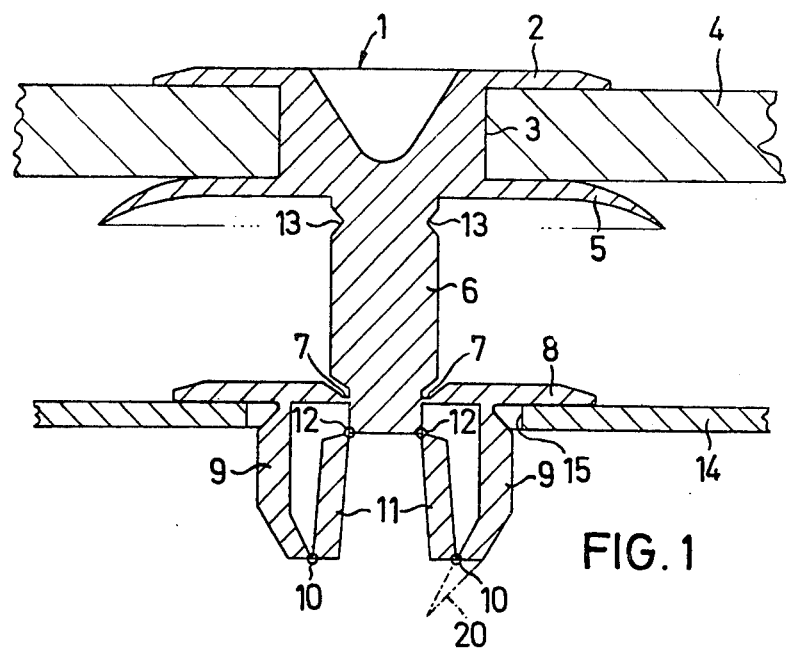
FIG. 1 illustrates a vertical section through a fastening clip in accordance with the invention in position on the body panel but not yet fixed.

Because the two examples of a fastening clip in accordance with the invention shown in the drawings are identical to one another with the exception of minor differences, identical references have been used for identical parts and the mode of operation of the clip has been explained only once.

In the Figures, a fastening clip 1 or 1' in a known manner exhibits a flat, disc-shaped retainer head 2 extending perpendicularly to the clip axis, a central circular neck 3 having a length corresponding to the thickness of a trim element 4 or the like and a thin disc-shaped sealing collar 5 extending parallel to the retainer head 6.

The sealing collar 5 is followed by a central, rectangular shank 6 connected through a deliberate frangible point 7 to a supporting disc 8 of part circular shape. Formed on the underside of the supporting disc 8 are two fastening clip arms 9 of substantially rectangular cross section that extend parallel to the clip axis and away from the supporting disc 8, these arms being designed to be inclined when the clip is in operative position. The other ends of the clip arms 9 are articulated through respective integral hinges 10 in each case to spreader arm 11 of rectangular cross section extending substantially parallel to the clip axis back to the supporting disc 8. The other ends of the spreader arms 11 are articulated through integral hinges 12 to that end of the shank 6 which extends beyond the deliberate frangible point 7. The rectangular shank 6 is provided at the top of its transverse sides with detent grooves 13 adapted to cooperate with the break edges 17, these being designed as detent edges, of the deliberate frangible point 7 in the following fashion: The fastening clip 1 is inserted into an opening in the trim element 4 in an conventional manner. The trim element 4 (or to put it more generally, an upholstered covering element) with a number of fixing clips 1 in position in it is now offered up to a body panel 14 which is to be covered. The clip arms 9, because of their dimensions, are readily insertable even into a locating hole 15 of minimum size until the supporting disc 8 comes up against the body panel 14.

Through an ensuing knock or application of pressure with the heel of the hand to the trim element in the neighborhood of the individual fastening clips 1, this in a manner conventionally employed when assembling these elements, the deliberate frangible point 7 is ruptured and the shank 6 is driven through the disc elastically deforming the detent edges 17 formed at the resultant opening 16. This causes the spreader arms 11 to spread apart so that the latter because of their articulating attachment to the clip arm 9 incline the latter outwardly forming detent shoulders causing the supporting disc 8 to be firmly clamped against the perimeter of the locating hole 15 in the body panel 14. At the end of the inward motion of the shank 6, the detent edges 17 engage in the detent grooves 13 in the transverse sides of the shanks 6 and thus retain the fastening clip in its assembled position.

The engaging, securing and disengaging force required in the case of the fastening clip in accordance with the invention is thus influenced by parameters which the designer can arbitrarily vary by corresponding dimensioning of the detent edges 17 and the detent grooves 13. The dimensions can be kept within tight tolerances because of the way in which the retention clip is manufactured by injection moulding.

The fastening clip in accordance with the invention can thus reliably be so designed that a desired retaining force is reliably and uniformly achieved.

Figure 2:
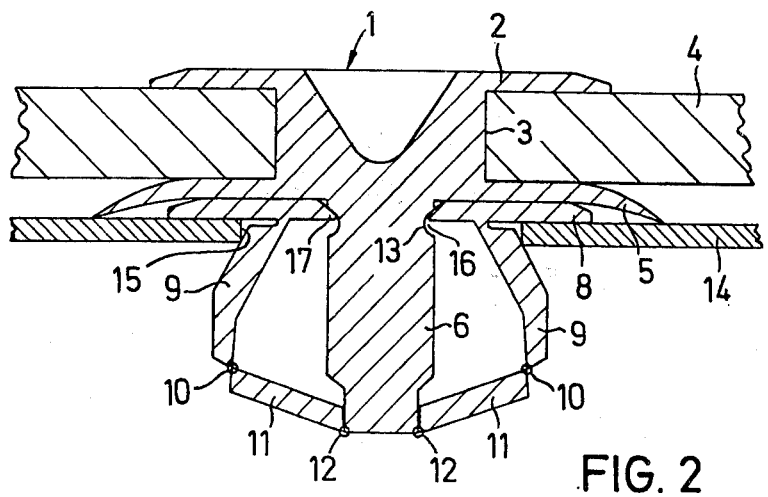
FIG. 2 is a vertical section through a clip in accordance with the invention in the fixed position.
Figure 1A:
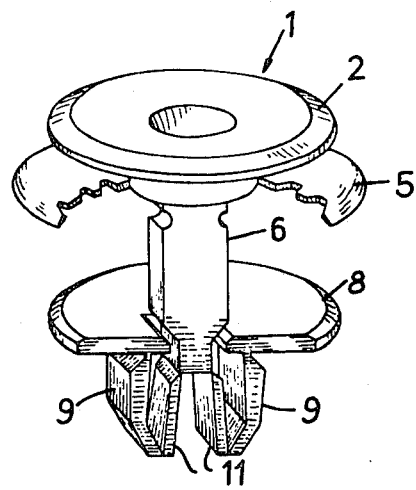
FIG. 1a illustrates an oblique view of the clip in accordance with the invention before assembly.
Figure 3A:
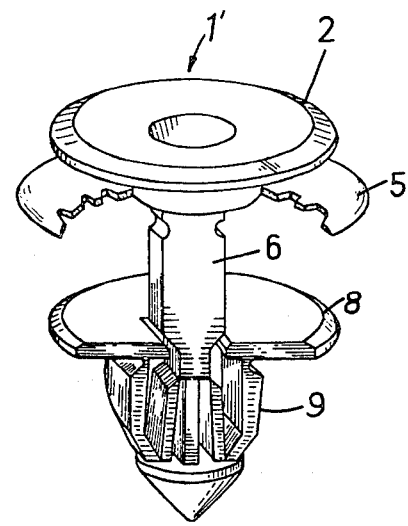
FIG. 3a illustrates an oblique view of the clip of FIG. 3.
Figure 2A:
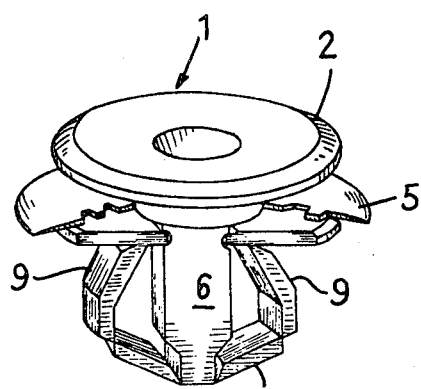
FIG. 2a is an oblique view of a clip in accordance with the invention in the assembled condition.
Figure 4A:
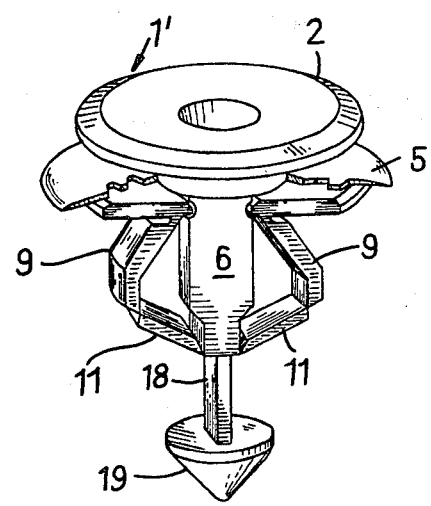
FIG 4a is an oblique view of the clip shown in FIG. 4.
Figure 3:
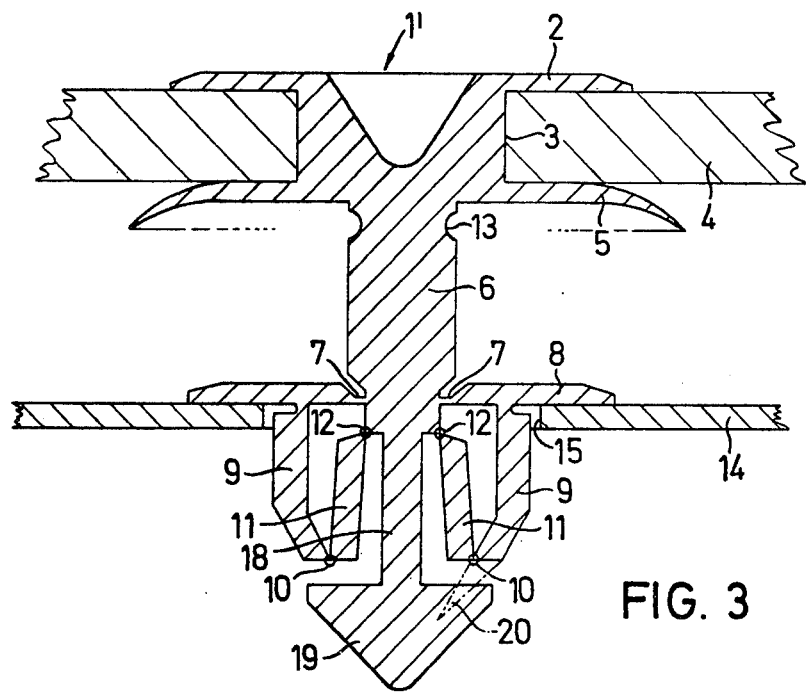
FIG. 3 is a vertical section through another embodiment of a clip in accordance with the invention before being fixed in place.
Figure 4:
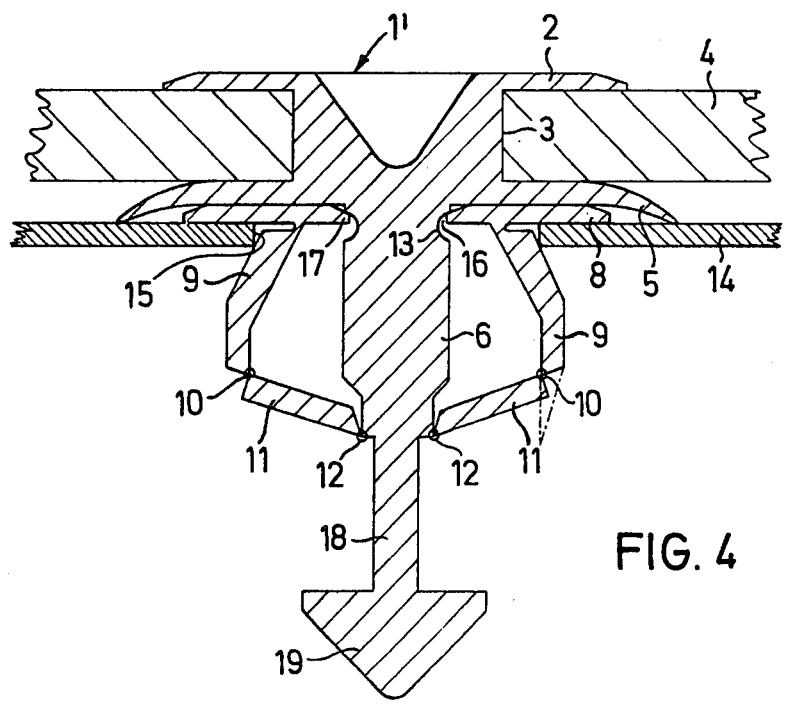
FIG. 4 is a vertical section through the further embodiment of a clip this time in the fixed position.

The further embodiment of a fastening clip 1' in accordance with the invention shown in FIGS. 3 and 4 has substantially the same construction as that shown in FIGS. 1 and 2. The sole distinction resides in the provision of an extension 18 on the shank 6. The extension has a conical guidehead 19 whose base overlaps the clip and spreader arms 9 and 11. The guidehead 19 is intended to facilitate the introduction of the clip 1' in the locating hole 15 and to prevent premature spreading of the clip arms 9 should they happen to strike one side of the rim of the hole.

The same function can also be performed by projections 20 formed on the clip arms 9 and indicated in the FIGS. 1 and 3 in the form of chaindotted lines.

As an alternative to the break edges at the deliberate frangible point 7, these forming the detent edges 17, the deliberate frangible point may be arranged at one of the long sides of the rectangular shank 6 towards the supporting disc 8 while the transverse sides of the shank 6 are remote from the supporting disc 8 so that the detent edges 17 cooperating with the grooves 13 can be shaped right from the start in a desired manner.

In amplification, it may be pointed out that the diameter of the sealing collar 5 is made larger than that of the supporting disc 8 in such a fashion that it overlaps the latter and thus seals the locating hole 15 in a known manner.

It is to be understood this invention is not limited to the exact constructions illustrated and described above but that various changes and modifications may be made without departing from the spirit and scope of the invention as defined by the following claims.

We claim:

1. A fastening clip for upholstered covering elements in particular motor vehicle trim elements, the fastening clip having a flat, disc-shaped retainer head extending perpendicularly to the clip axis, a central circular neck having a length corresponding to the thickness of a trim element, a thin disc-shaped sealing collar disposed parallel to the retainer head and retention elements attached to the latter, the retention elements consisting of at least two mutually oppositely disposed resilient arms which cooperate through detent shoulders with a locating hole in a vehicle body panel characterized in that the sealing collar is adjoined by a central rectangular shank connected through a deliberate frangible point to a supporting disc of part circular shape on whose underside two clip arms extend parallel to the clip axis and away from a supporting disc, these arms having substantially rectangular cross sections and being formed in such a fashion that they can be inclined, the other ends of these arms being articulated through integral hinges to spreader arms extending back substantially parallel to the clip axis to the supporting disc, these spreader arms having rectangular cross sections and being articulated through integral hinges to an end of the shank which extends downwards beyond the deliberate frangible point, the shank exhibiting at the top of its transverse sides detent grooves which cooperate with the break edges, these being designed as detent edges, of the deliberate frangible point.

2. A fastening clip as claimed in claim 1, characterized in that the end of the shank has an extension which terminates in a conical guidehead the base of which overlaps the clip spreader arms.

3. A fastening clip as claimed in claim 1 characterized in that the deliberate frangible point is provided on one of the longitudinal sides of the rectangular shank while at the opening of the supporting disc specially shaped detent edges located at a short interval opposite the transverse sides of the shank are provided which cooperate with the detent grooves on the shank.

4. A fastening clip as claimed in claim 1 characterized in that the diameter of the sealing collar is made larger than that of the supporting disc in such a fashion that it surrounds the latter and seals off the locating hole in the panel.

5. A fastening clip as claimed in claim 4 characterized in that the clip arms are provided with projections forming a guide tip.

6. A fastening clip as claimed in claim 2 characterized in that the diameter of the sealing collar is made larger than that of the supporting disc in such a fashion that it surrounds the latter and seals off the locating hole in the panel.

7. A fastening clip as claimed in claim 3 characterized in that the clip arms are provided with projections forming a guide tip.

* * * * *